United States Patent
Ide et al.

(10) Patent No.: US 8,275,539 B2
(45) Date of Patent: Sep. 25, 2012

(54) CONTROL SYSTEM AND METHOD FOR INTERNAL COMBUSTION ENGINE

(75) Inventors: Hirohito Ide, Saitama-ken (JP); Hideharu Takamiya, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 461 days.

(21) Appl. No.: 12/645,960

(22) Filed: Dec. 23, 2009

(65) Prior Publication Data

US 2010/0175646 A1 Jul. 15, 2010

(30) Foreign Application Priority Data

Jan. 9, 2009 (JP) ................. 2009-004079

(51) Int. Cl.
*F02D 43/00* (2006.01)
*F01L 1/34* (2006.01)
(52) U.S. Cl. .................... 701/114; 123/90.15
(58) Field of Classification Search .............. 701/114, 701/102, 101, 115; 123/90.15, 90.33, 190.16, 123/196 R
See application file for complete search history.

(56) References Cited

U.S. PATENT DOCUMENTS

| | | | |
|---|---|---|---|
| 6,257,184 B1 | 7/2001 | Yamagishi et al. | |
| 6,397,803 B1 | 6/2002 | Fujiwara et al. | |
| 6,662,771 B2 * | 12/2003 | Kobayashi | 123/90.33 |
| 7,720,591 B2 * | 5/2010 | Takamiya et al. | 701/103 |
| 7,801,667 B2 * | 9/2010 | Takamiya et al. | 701/103 |
| 2003/0136361 A1 | 7/2003 | Ogiso | |

FOREIGN PATENT DOCUMENTS

| | | |
|---|---|---|
| EP | 1 344 897 A2 | 9/2003 |
| EP | 1 375 883 A2 | 1/2004 |
| JP | 2001-234765 A | 8/2001 |
| JP | 2002-089305 A | 3/2002 |
| JP | 2002-309916 A | 10/2002 |
| JP | 2003-172189 A | 6/2003 |
| JP | 2004-293405 A | 10/2004 |
| JP | 2007-100522 A | 4/2007 |
| JP | 2008-267300 A | 11/2008 |
| JP | 2008-291814 A | 12/2008 |

* cited by examiner

*Primary Examiner* — Hieu T Vo
(74) *Attorney, Agent, or Firm* — Arent Fox LLP

(57) ABSTRACT

A control system for an internal combustion engine, which is capable of preventing a variable valve-operating mechanism from suffering problems due to insufficiency of lubrication oil immediately after starting the engine. The ECU of the engine determines an amount of lubrication oil lubricating the variable valve-operating mechanism which is capable of continuously changing an intake lift, holds the intake lift at a predetermined lift if it is determined that the oil amount is less than a predetermined amount, and controls the amount of intake air by changing the opening of a throttle valve capable of adjusting the amount of intake air, when the operation of the variable valve-operating mechanism is inhibited.

20 Claims, 9 Drawing Sheets

CONTROL SYSTEM AND METHOD FOR INTERNAL COMBUSTION ENGINE

BACKGROUND OF THE INVENTION

1. Field of the Invention

The present invention relates to a control system and method for an internal combustion engine which includes a variable valve-operating mechanism which is capable of continuously changing the lift of an intake valve, and an intake air amount-adjusting valve which is disposed at a location upstream of the intake valve and is capable of adjusting the amount of intake air.

2. Description of the Related Art

As a control system for an internal combustion engine of this kind, there has been proposed a method disclosed in Japanese Laid-Open Patent Publication (Kokai) No. 2003-172189. In this control system, to stabilize the amount of intake air during a time period over which the conditions of automatic operation of the engine are not stable, control of the intake air amount by a variable valve-operating mechanism is inhibited, but performed by control of an intake air amount-adjusting valve. Further, at this time, the time period over which the intake air amount control by the variable valve-operating mechanism is to be inhibited is set according to the number of automatic stops or number of automatic starts of the engine, and if the number is small, the time period is set to be short.

In the conventional control system for an internal combustion engine, for some time after the start of the engine, the number of times of automatic stops or number of times of automatic starts of the engine is small, and hence the time period over which the intake air amount control by the variable valve-operating mechanism is to be stopped is set to be short. Therefore, there is a fear that the variable valve-operating mechanism starts to be operated before lubrication oil for lubricating the variable valve-operating mechanism is sufficiently distributed throughout the mechanism, causing the problems of abrasion, damage, etc. due to insufficiency of the lubrication oil.

SUMMARY OF THE INVENTION

It is an object of the present invention to provide a control system and method for an internal combustion engine, which is capable of preventing a variable valve-operating mechanism from suffering problems due to insufficiency of lubrication oil, by starting to operate the variable valve-operating mechanism at a proper timing in which the lubrication oil is sufficiently distributed throughout the mechanism.

To attain the above object, in a first aspect of the present invention, there is provided a control system for an internal combustion engine including a variable valve-operating mechanism which is capable of continuously changing a lift of an intake valve, and an intake air amount-adjusting valve which is disposed at a location upstream of the intake valve and is capable of adjusting an intake air amount, comprising oil amount-determining means for determining whether or not an oil amount of lubrication oil that lubricates the variable valve-operating mechanism reaches a predetermined amount, variable valve-operating mechanism control means for inhibiting an operation of the variable valve-operating mechanism and holding a lift of the intake valve at a predetermined lift except when it is determined by the oil amount-determining means that the oil amount reaches the predetermined amount, and intake air amount-adjusting valve control means for controlling the intake air amount by changing an opening of the intake air amount-adjusting valve when the operation of the variable valve-operating mechanism is inhibited by the variable valve-operating mechanism control means.

With the configuration of the control system for an internal combustion engine according to the first aspect of the present invention, the amount of oil which lubricates the variable valve-operating mechanism is determined by the oil amount-determining means, and further, except when it is determined that the oil amount reaches the predetermined amount, the operation of the variable valve-operating mechanism is inhibited, and the lift of the intake valve is held at the predetermined lift. Further, when the operation of the variable valve-operating mechanism is inhibited in such a state, the intake air amount is controlled by changing the opening of the intake air amount-adjusting valve by the intake air amount-adjusting valve control means. Thus, the operation of the variable valve-operating mechanism is inhibited when the determined oil amount does not reach the predetermined amount, and hence it is possible to positively prevent the case where the variable valve-operating mechanism is operated in a state in which the lubrication oil is insufficient, whereby it is possible to prevent the variable valve-operating mechanism from suffering the problems of abrasion, damage, etc. due to the insufficiency of the lubrication oil. Further, during inhibition of the operation of the variable valve-operating mechanism, it is possible to properly control the intake air amount by changing the opening of the intake air amount-adjusting valve.

Preferably, the oil amount-determining means carries out determination of the oil amount after the control system is started or after an instruction for starting the engine is given.

With the configuration of the preferred embodiment, the determination of the oil amount is carried out after the control system is started or after an instruction for starting the engine is given, and hence it is possible to positively inhibit the operation of the variable valve-operating mechanism in the state in which the lubrication oil is insufficient, starting from the time of starting the control system or from the time of instructing to start the engine. It should be noted that the phrase "instruction for starting the engine" is intended to mean turn-on of a start switch or satisfaction of conditions for automatic starting.

Preferably, the oil amount-determining means carries out determination of the oil amount before starting of the engine is started.

With the configuration of the preferred embodiment, the determination of the oil amount is carried out before the starting of the engine is started, and hence it is possible to positively inhibit the operation of the variable valve-operating mechanism in the state where the lubrication oil is insufficient when the engine is started.

Preferably, the variable valve-operating mechanism control means inhibits the operation of the variable valve-operating mechanism until a determination result of the oil amount is obtained by the oil amount-determining means.

With the configuration of the preferred embodiment, the operation of the variable valve-operating mechanism is inhibited until the determination result of the oil amount determined by the oil amount-determining means is obtained. This makes it possible to positively prevent the case where the variable valve-operating mechanism is operated in the state where the lubrication oil is insufficient, in the case where the determination of the oil amount is not carried out, or the determination result of the oil amount is not finally determined.

Preferably, the oil amount-determining means determines the oil amount based on a stop time period of the engine.

With the configuration of the preferred embodiment, the determination of the oil amount is carried out based on the time period during which the engine is at rest. The degree of flow of the lubrication oil out of the variable valve-operating mechanism varies depending on the time period between the time point at which the engine is stopped and the time point at which the engine is started, and for example, as the time period during which the engine is at rest is longer, the degree of outflow of the lubrication oil becomes larger. Therefore, it is possible to properly determine the oil amount of the lubrication oil based on the time period during which the engine is at rest. Further, it is possible to easily carry out the determination of the oil amount without providing a new detecting means.

Preferably, the oil amount-determining means determines whether or not the oil amount reaches the predetermined amount based on an operating time period of the engine.

With the configuration of the preferred embodiment, it is determined by the oil amount-determining means based on the operating time period of the engine that the lubrication oil is sufficiently distributed throughout the variable valve-operating mechanism along with the operation of the engine, whereby the oil amount reaches the predetermined amount, and according to this determination, the inhibition of the operation of the variable valve-operating mechanism by the variable valve-operating mechanism control means is canceled. This makes it possible to start the operation of the variable valve-operating mechanism at a proper timing in which the lubrication oil is sufficiently distributed throughout the mechanism.

More preferably, the control system further comprises predetermined time-setting means for setting the predetermined time based on the stop time period of the engine.

As mentioned above, the degree of flow of the lubrication oil out of the variable valve-operating mechanism varies depending on the time period during which the engine is at rest. According to the present invention, the predetermined time period as the time period for inhibiting the operation of the variable valve-operating mechanism is set according to the time period during which the engine is at rest, and hence it is possible to start the operation of the variable valve-operating mechanism at a proper timing according to the degree of flow of the lubrication oil out of the variable valve-operating mechanism without providing a new detecting means.

Preferably, when the engine is stopped, the variable valve-operating mechanism control means controls the variable valve-operating mechanism such that the lift of the intake valve becomes equal to the predetermined lift.

With the configuration of the preferred embodiment, when the engine is at rest, the lift of the intake valve is controlled to the predetermined lift. Therefore, if it is determined that the oil amount of the lubrication oil does not reach the predetermined amount, it is possible to smoothly shift the control to the mode in which the lift of the intake valve is held at the predetermined lift without operating the variable valve-operating mechanism at all.

Preferably, the predetermined lift is smaller than a maximum lift of the intake valve, and is larger than a minimum lift of the intake valve.

With the configuration of the preferred embodiment, when the operation of the variable valve-operating mechanism is inhibited, the lift of the intake valve is held at the predetermined lift of the above-mentioned degree, and hence it is possible to ensure the intake air amount required for starting of the engine or traveling of the vehicle by the control of the intake air amount by the intake air amount-adjusting valve, whereby it is possible to improve the startability and the traveling characteristics. Further, by preventing excessive valve overlap, it is possible to prevent the idle operation from being destabilized and the exhaust emission from being increased.

More preferably, the predetermined lift is larger than a lift which is set when the engine is in an idle state.

With the configuration of the preferred embodiment, the predetermined lift is larger than the lift which is set when the engine is in the idle state, and hence even if the engine is shifted to a state for vehicle traveling while holding the lift of the intake valve at the predetermined lift, it is possible to ensure the intake air amount required for the traveling by the control of the intake air amount by the intake air amount-adjusting valve, whereby it is possible to improve the traveling characteristics.

To attain the above object, in a second aspect of the present invention, there is provided a method of controlling an internal combustion engine including a variable valve-operating mechanism which is capable of continuously changing a lift of an intake valve, and an intake air amount-adjusting valve which is disposed at a location upstream of the intake valve and is capable of adjusting an intake air amount, comprising an oil amount-determining step of determining whether or not an oil amount of lubrication oil that lubricates the variable valve-operating mechanism reaches a predetermined amount, a variable valve-operating mechanism control step of inhibiting an operation of the variable valve-operating mechanism and holding a lift of the intake valve at a predetermined lift except when it is determined in the oil amount-determining step that the oil amount reaches the predetermined amount, and an intake air amount-adjusting valve control step of controlling the intake air amount by changing an opening of the intake air amount-adjusting valve when the operation of the variable valve-operating mechanism is inhibited in the variable valve-operating mechanism control step.

With the configuration of the method according to the second aspect of the present invention, it is possible to obtain the same advantageous effects as provided by the first aspect of the present invention.

Preferably, the oil amount-determining step includes carrying out determination of the oil amount after the control system is started or after an instruction for starting the engine is given.

Preferably, the oil amount-determining step includes carrying out determination of the oil amount before starting of the engine is started.

Preferably, the variable valve-operating mechanism control step includes inhibiting the operation of the variable valve-operating mechanism until a determination result of the oil amount is obtained in the oil amount-determining step.

Preferably, the oil amount-determining step includes determining the oil amount based on a stop time period of the engine.

Preferably, the oil amount-determining step includes determining whether or not the oil amount reaches the predetermined amount based on an operating time period of the engine.

More preferably, the method further comprises a predetermined time-setting step of setting the predetermined time based on the stop time period of the engine.

Preferably, the variable valve-operating mechanism control step includes controlling the variable valve-operating mechanism such that the lift of the intake valve becomes equal to the predetermined lift.

Preferably, the predetermined lift is smaller than a maximum lift of the intake valve, and is larger than a minimum lift of the intake valve.

More preferably, the predetermined lift is larger than a lift which is set when the engine is in an idle state.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
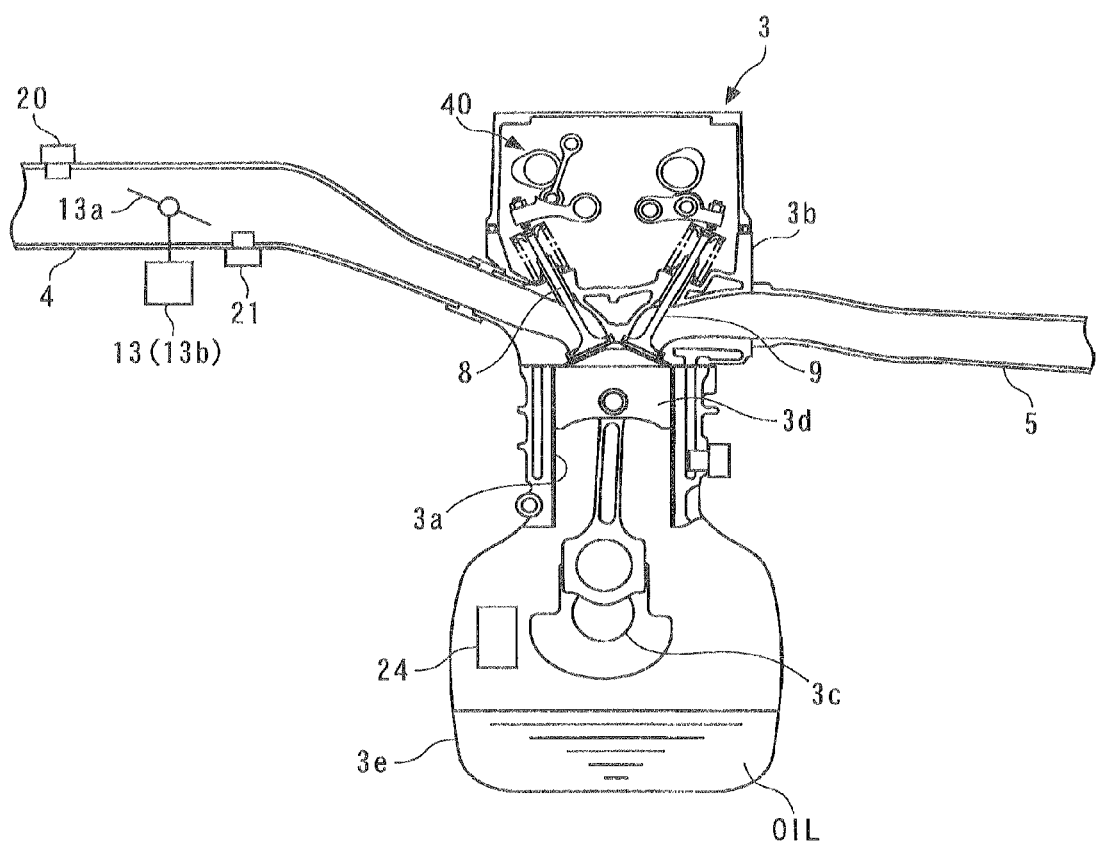
FIG. 1 is a schematic view of an internal combustion engine to which is applied a control system according to a first embodiment of the present invention.
Figure 2:
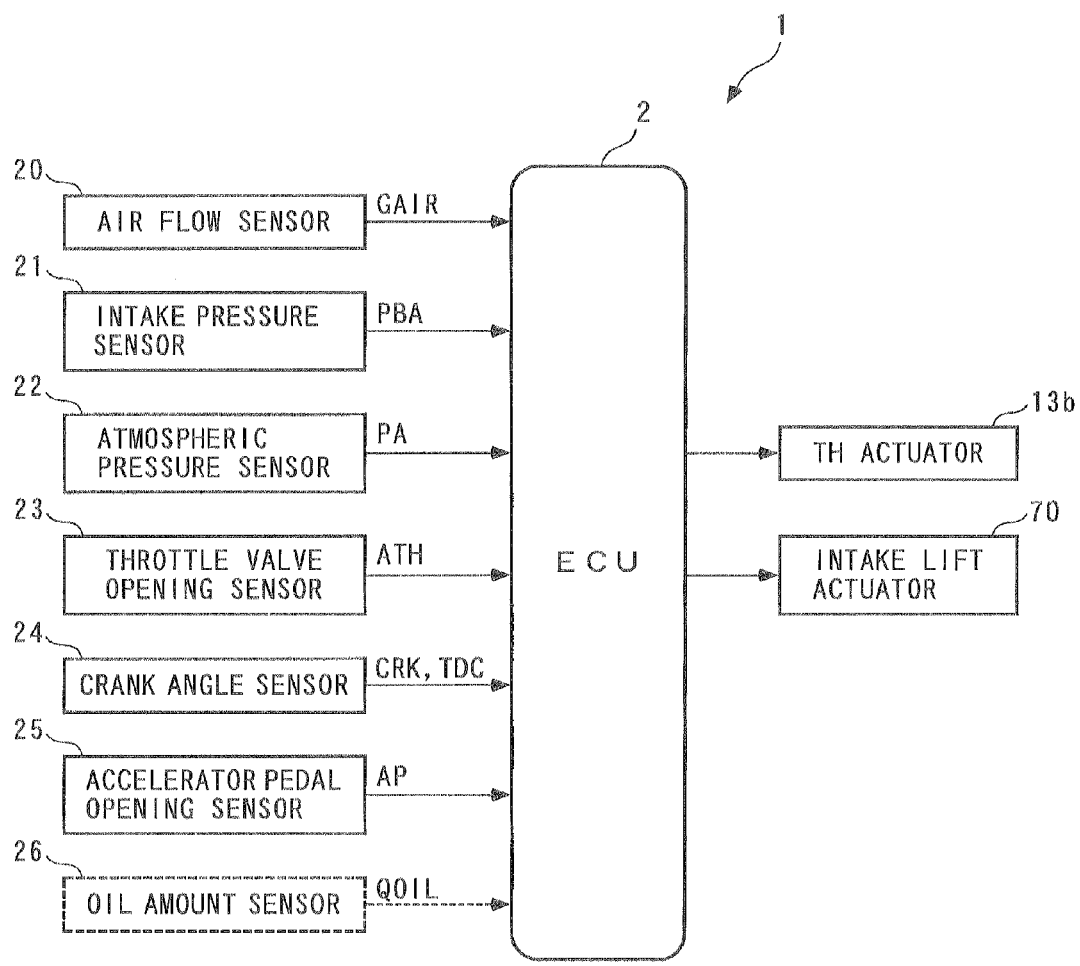
FIG. 2 is a block diagram of the control system.

The invention will now be described in detail with reference to the drawings showing preferred embodiment thereof. FIG. 1 schematically shows an internal combustion engine 3 to which is applied a control system 1 (see FIG. 2) according to a first embodiment of the present invention The internal combustion engine (hereinafter referred to as "the engine") 3 is a gasoline engine of e.g. an in-line four-cylinder type, and is installed on a vehicle (not shown).

The engine 3 has a cylinder head 3b having an intake pipe 4 and an exhaust pipe 5 connected thereto, a pair of intake valves 8 and 8 (only one of which is shown), and a pair of exhaust valves 9 and 9 (only one of which is shown) disposed therein, provided for each of cylinders 3a thereof. The intake valves 8 are opened and closed by an intake-side valve-operating mechanism 40.

Figure 3:
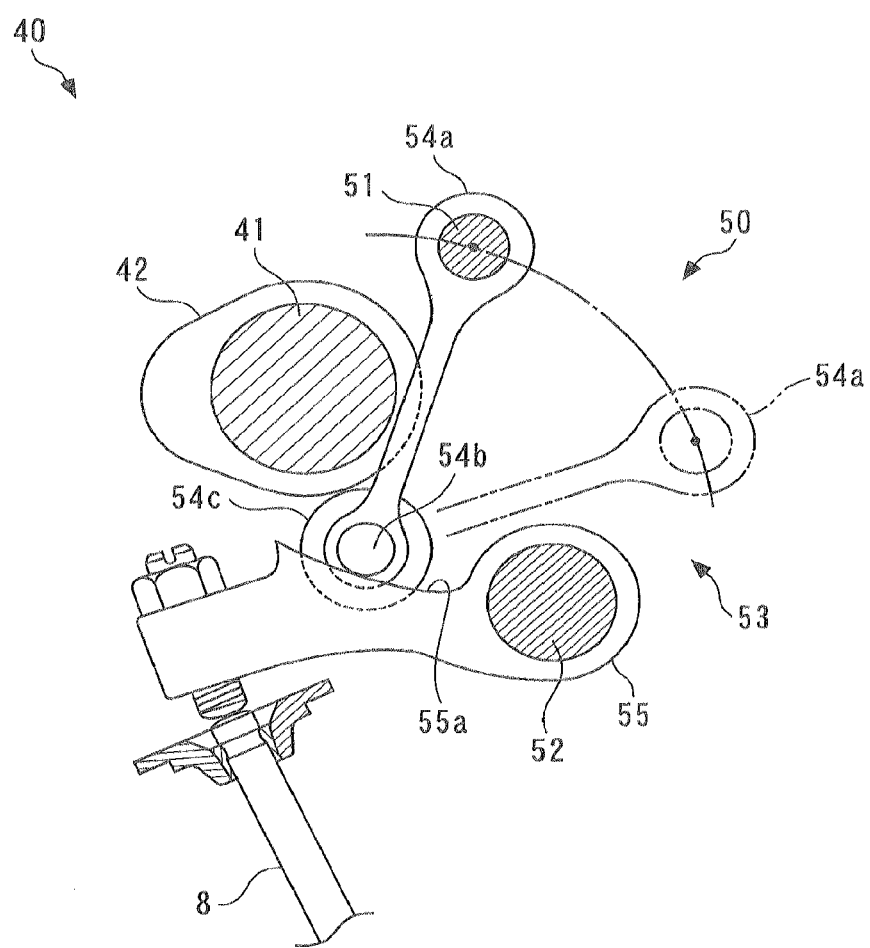
FIG. 3 is a schematic view of an arrangement of an intake-side valve-operating mechanism.

As shown in FIG. 3, the intake-side valve-operating mechanism 40 is comprised of an intake cam shaft 41, an intake cam 42, and a variable intake lift mechanism 50. In the present embodiment, the lift of the intake valves 8 is steplessly changed by the variable intake lift mechanism 50. It should be noted that the phrase "the lift of the intake valves 8 (hereinafter referred to as the "intake lift")" is intended to mean the maximum lift of the intake valves 8.

The intake cam shaft 41 is connected to a crankshaft 3c (see FIG. 1) via an intake sprocket and a timing chain (neither of which is shown), and rotates once whenever the crankshaft 3c rotates twice.

Figure 4:
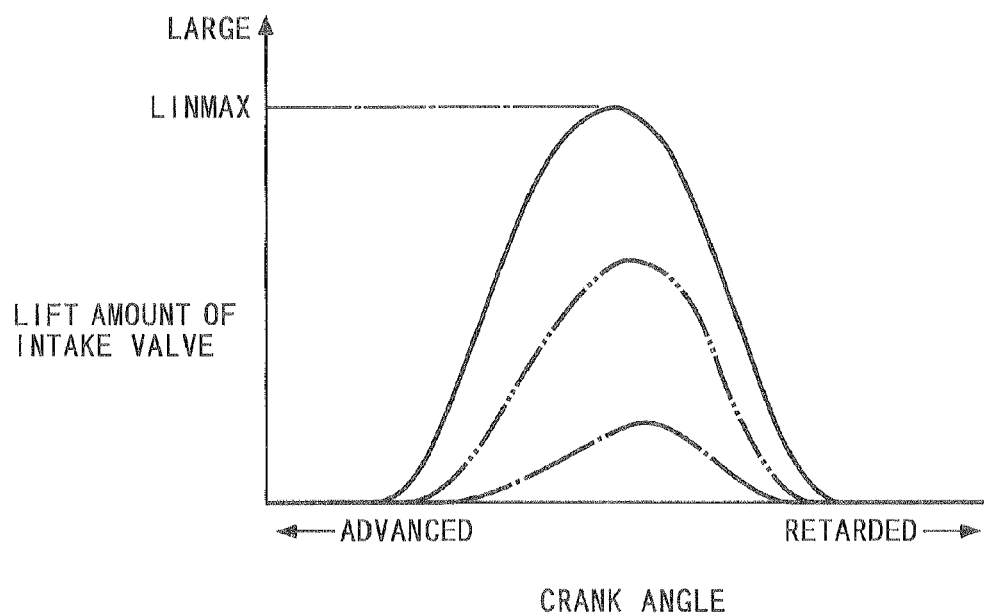
FIG. 4 is a diagram showing valve lift curves of an intake valve according to changes in intake lift caused by a variable intake lift mechanism.

The variable intake lift mechanism 50 is configured to steplessly change an intake lift LIFTIN between a minimum lift LINMIN (value of 0) and a predetermined maximum lift LINMAX (see FIG. 4). The arrangement of the variable intake lift mechanism 50 is similar to that proposed in Japanese Laid-Open Patent Publication (Kokai) No. 2007-100522 by the present assignee, and hence hereinafter, a brief description will be given of the outline thereof.

As shown in FIG. 3, the variable intake lift mechanism 50 is comprised of a control shaft 51, a rocker arm shaft 52, rocker arm mechanisms 53 which are provided on these shafts 51 and 52 for the respective cylinders 3a, and an intake lift actuator 70 (see FIG. 2) which simultaneously actuates these rocker arm mechanisms 53.

The rocker arm mechanisms 53 are each comprised of a link 54a, a roller shaft 54b, a roller 54c and a rocker arm 55. Further, the intake lift actuator 70 is a combination of a motor and a reduction gear mechanism (neither of which is shown), and if the intake lift actuator 70 is driven by a control input delivered from an ECU 2, the control shaft 51 is pivotally moved, whereby the link 54a is pivoted about the roller shaft 54b.

When the link 54a is at a zero lift position indicated by a solid line in FIG. 4, if the roller 54c is pushed toward the rocker arm shaft 52 by the intake cam 42 along with rotation of the intake cam shaft 41, the link 54a is pivotally moved counterclockwise about the control shaft 51 as viewed in FIG. 3. At this time, the rocker arm 55 is held at a valve-closing position shown in FIG. 3 by the urging force of a valve spring since a guide surface 55a of the rocker arm 55 has a shape which coincides with an arc about the control shaft 51. Therefore, the intake lift LIFTIN is held at 0, and the intake valve 8 is held in a closed state.

On the other hand, assuming that the control shaft 51 is pivotally moved causing the link 54a to be pivoted from the zero lift position toward the maximum lift position (position indicated by a two dot-chain line in FIG. 3) and then the control shaft 51 is held in the resulting position, if the link 54a is pivotally moved counterclockwise about the control shaft 51 by rotation of the intake cam 42 as viewed in FIG. 3, the rocker arm 55 is pivoted downward from the valve-closing position as viewed in FIG. 3, against the urging force of the valve spring to open the intake valve 8. At this time, the amount of pivotal motion, i.e. the intake lift LIFTIN of the rocker arm 55 becomes larger, as the link 54a is closer toward the maximum lift position.

With the above-described arrangement, as the link 54a is closer toward the maximum lift position, the intake valve 8 is opened with a larger lift. More specifically, during rotation of the intake cam 42, when the link 54a is at the maximum lift position, the intake valve 8 is opened along a valve lift curve indicated by a solid line illustrated in FIG. 4, and the intake lift LIFTIN becomes equal to the maximum lift LINMAX. Therefore, in this variable intake lift mechanism 50, by pivotally moving the link 54a between the zero lift position and the maximum lift position via the intake lift actuator 70, it is possible to steplessly vary the intake lift LIFTIN between the minimum lift LINMIN (value of 0) and the predetermined maximum lift LINMAX. Thus, in the engine 3, the intake lift LIFTIN is steplessly changed by the intake-side valve-operating mechanism 40. It should be noted that the lubrication of the variable intake lift mechanism 50 is performed by pumping a lubrication oil OIL pooled in an oil pan 3e by an oil pump (not shown) driven by the engine 3.

The engine 3 is provided with a crank angle sensor 24. The crank angle sensor 24 is formed by a magnet rotor and an MRE pickup (neither of which is shown), and delivers a CRK signal and a TDC signal, which are both pulse signals, to the ECU 2 along with rotation of the crankshaft 3c.

Each pulse of the CRK signal is generated whenever the crankshaft 3c rotates through a predetermined crank angle. The ECU 2 calculates rotational speed (hereinafter referred to as the "engine speed") NE of the engine 3 based on the CRK signal. Further, the TDC signal indicates that a piston 3d of each cylinder 3a is at a predetermined crank angle position in the vicinity of TDC (top dead center) at the start of the suction stroke thereof, and in the case of the four-cylinder engine of the present embodiment, a pulse thereof is delivered whenever the crankshaft rotates through 180 degrees.

Further, the intake pipe 4 is provided with a throttle valve mechanism 13. The throttle valve mechanism 13 includes a throttle valve 13a disposed in the intake pipe 4 in a pivotally-movable manner, and a TH actuator 13b which drives the throttle valve 13a. The TH actuator 13b is a combination of a motor and a gear mechanism (neither of which is shown), and is driven by a drive signal delivered from the ECU 2. Therefore, an opening (hereinafter referred to as the "throttle valve opening") ATH of the throttle valve 13a is varied, whereby the amount of fresh air (hereinafter referred to as the "intake air amount") GAIR drawn into the cylinders 3a is controlled. Further, the throttle valve opening ATH is detected by a throttle valve opening sensor 23 (see FIG. 2), and a signal indicative of the sensed throttle valve opening ATH is delivered to the ECU 2. The intake pipe 4 is provided with an air flow sensor 20 for detecting the intake air amount GAIR at a location upstream of the throttle valve 13a, and a signal indicative of the sensed intake air amount GAIR is delivered to the ECU 2.

Further, the intake pipe 4 is provided with an intake pressure sensor 21 at a location downstream of the throttle valve 13a. The intake pressure sensor 21 detects pressure of the intake air (hereinafter referred to as the "intake pressure") PBA, and delivers a signal indicative of the sensed intake pressure PBA to the ECU 2.

Further, an atmospheric pressure sensor 22 and an accelerator pedal opening sensor 25 are connected to the ECU 2. The atmospheric pressure sensor 22 detects an atmospheric pressure PA, and the accelerator pedal opening sensor 25 detects the stepped-on amount of an accelerator pedal, not shown, (hereinafter referred to as the "accelerator pedal opening") AP. Signals indicative of the sensed atmospheric pressure PA and sensed accelerator pedal opening AP are delivered to the ECU 2.

The ECU 2 is implemented by a microcomputer comprised of an I/O interface, a CPU, a RAM, and a ROM, (none of which are specifically shown). The detection signals from the aforementioned sensors 20 to 25 are input to the CPU after the I/O interface performs A/D conversion and waveform shaping thereon. In response to these input signals, the ECU 2 determines operating conditions of the engine 3 according to a control program stored in the ROM, and controls the operation of the engine 3 including the control system 1, according to the determined operating conditions of the engine. It should be noted that the ECU 2 is started the instant the ignition switch is turned on, and can be operated after the ignition switch is turned off. Further, the ECU 2 is provided with an engine stop timer for measuring a time period which elapses after the ignition switch is turned off.

It should be noted that in the present embodiment, the ECU 2 corresponds to oil amount-determining means, variable valve-operating mechanism control means, intake air amount-adjusting valve control means, and predetermined time-setting means in the present invention. Hereafter, a description will be given of various control processes executed by the ECU 2 with reference to the drawings.

Figure 5:
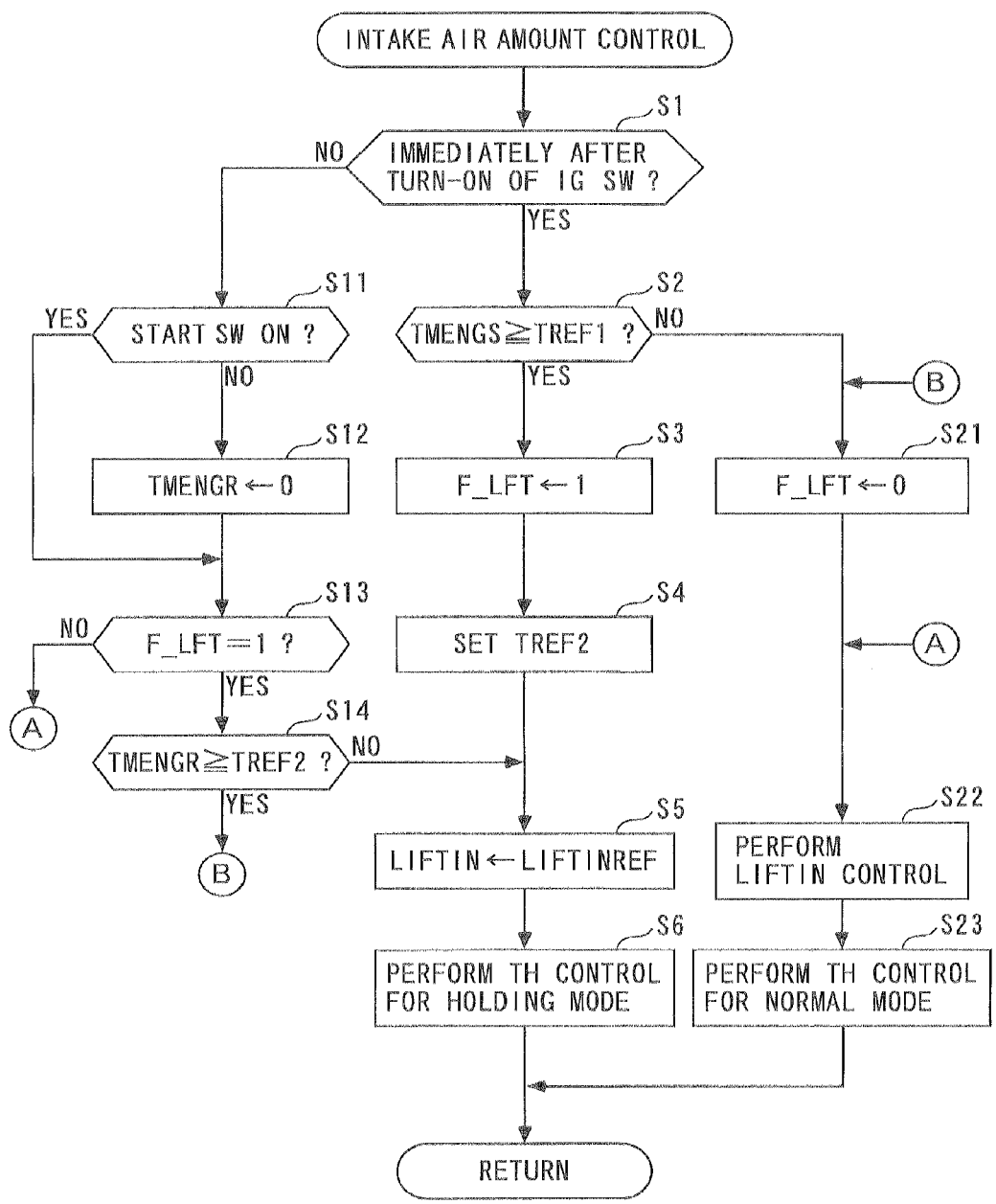
FIG. 5 is a flowchart of an intake air amount control process.

FIG. 5 shows an intake air amount control process. The present process is executed at predetermined intervals after starting the ECU 2. First, in a step 1 (shown as S1 in abbreviated form in FIG. 5; the following steps are also shown in abbreviated form), it is determined whether or not it is immediately after the turn-on of the ignition switch.

If the answer to this question is affirmative (YES), i.e. if it is immediately after the turn-on of the ignition switch, it is determined whether or not a timer value TMENGS of the engine stop timer, i.e. a time period of engine stop between a time point at which the engine 3 was stopped and a time point at which the engine 3 was started this time is not less than a first predetermined time period TREF1 (e.g. 12 hours) (step 2).

If the answer to this question is affirmative (YES), the time period during which the engine 3 was stopped is long, and hence it is determined that the degree of outflow of the lubrication oil OIL for lubricating the variable intake lift mechanism 50 is high, so that the amount of the lubrication oil OIL is less than a predetermined amount required for lubricating the variable intake lift mechanism 50. Therefore, it is judged that the operation of the variable intake lift mechanism 50 should be inhibited and the control should be shifted to a holding mode in which the intake lift LIFTIN is held, so that a lift holding flag F_LFT is set to 1 (step 3).

Figure 6:
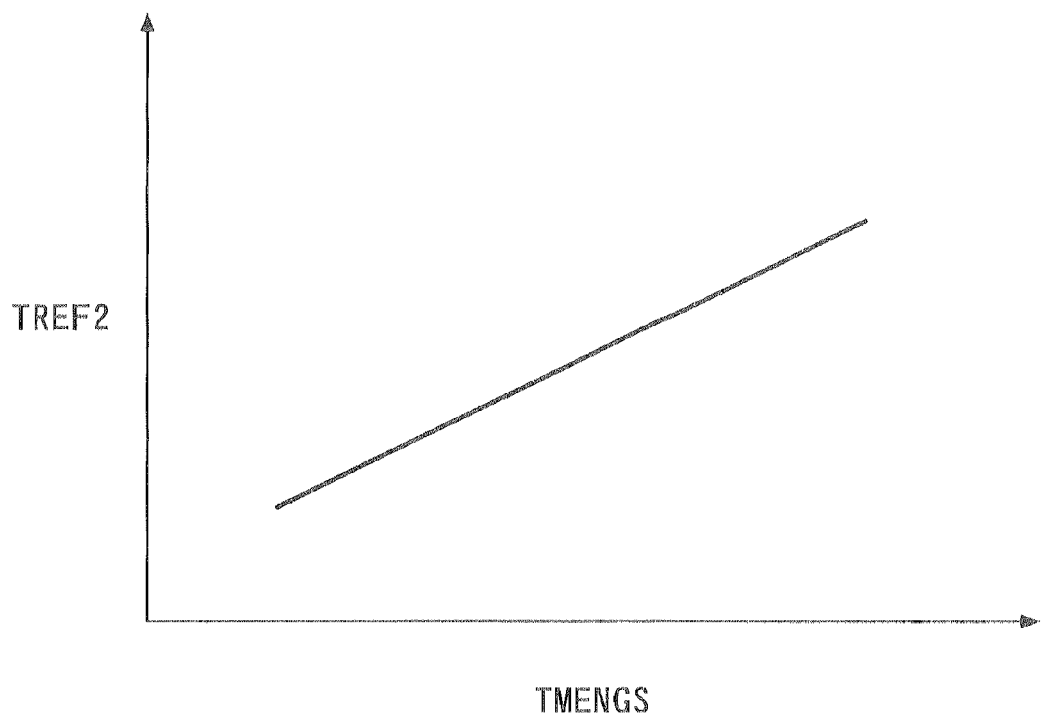
FIG. 6 is a map for setting a second predetermined time TREF2.

Next, a second predetermined time period TREF2 is set by searching a map in FIG. 6 according to the timer value TMENGS (step 4). As described hereinafter, the second predetermined time period TREF2 is set for determining a time period over which the holding mode in which the intake lift LIFTIN is held is to be executed. This map is configured such that as the timer value TMENGS of the engine stop timer is larger, the second predetermined time TREF2 is set to a larger value, because as the timer value TMENGS of the engine stop timer is larger, i.e. as the stop time period of the engine 3 is longer, the degree of flow of the lubrication oil OIL out of the variable intake lift mechanism 50 is high, and accordingly, the time required for distribution of the lubrication oil OIL throughout the variable intake lift mechanism 50 becomes longer.

Next, in a step 5, the intake lift LIFTIN is set to a predetermined lift LIFTINREF. By driving the intake lift actuator 70 of the variable intake lift mechanism 50 according to the setting, the intake lift LIFTIN is held at the predetermined lift LIFTINREF. The predetermined lift LIFTINREF is smaller than the maximum lift LINMAX, and is larger than the minimum lift LINMIN, and more specifically, is set to a larger value than a value of the intake lift LIFTIN which is set when the engine 3 is in an idle state.

Next, the intake air amount is controlled by carrying out the throttle valve control for the holding mode (step 6) on the throttle valve 13a, followed by terminating the present process. In this throttle valve control for the holding mode, the throttle valve opening ATH is controlled according to a target intake air amount GAIRCMD, a target idle engine speed NIDLECMD, and the atmospheric pressure PA, when the engine is in the idle state after being started. Further, when the engine is in an operating state for vehicle traveling following the idle state, the throttle valve opening ATH is controlled according to the target intake air amount GAIRCMD, the engine speed NE, and the atmospheric pressure PA. The target intake air amount GAIRCMD is calculated according to a demanded torque PMCMD. Further, the demanded torque PMCMD is calculated by searching a predetermined map (not shown) according to the engine speed NE and the accelerator pedal opening AP.

On the other hand, if the answer to the question of the step 2 is negative (NO), i.e. if the timer value TMENGS of the engine stop timer is smaller than the first predetermined time period TREF1, it is determined that the degree of flow of the lubrication oil OIL out of the variable intake lift mechanism 50 is small and the oil amount reaches the predetermined necessary amount, and hence that the control should be shifted to a normal mode, but not to the holding mode in which the intake lift LIFTIN is held, so that the lift holding flag F_LFT is set to 0 (step 21).

Next, in a step 22, the control for the normal mode is carried out on the variable intake lift mechanism 50. In this control for the normal mode, when the engine 3 is in the idle state, a basic lift is calculated by searching a predetermined map (not shown) according to the target intake air amount GAIRCMD, the target idle engine speed NIDLECMD, and the atmospheric pressure PA, and further, the intake lift LIFTIN is controlled based on the calculated basic lift. Further, when the engine is in the operating state for vehicle traveling, the basic lift is calculated by searching a predetermined map (not shown) according to the target intake air amount GAIRCMD, the engine speed NE, and the atmospheric pressure PA, and further, the intake lift LIFTIN is controlled based on the calculated basic lift.

Next, the throttle valve control for the normal mode is carried out on the throttle valve 13a (step 23), followed by terminating the present process. In this throttle valve control for the normal mode, the opening of the throttle valve 13a is controlled such that an intake negative pressure PB as the difference (PBA-PA) between the intake pressure PBA and the atmospheric pressure PA becomes equal to a target negative pressure PBCMD. The target negative pressure PBCMD is calculated according to the engine speed NE.

On the other hand, since in the processing cycle for the second or later time after the turn-on of the ignition switch, the answer to the question of the step 1 is negative (NO), then, it is determined whether or not a start switch has already been turned on (step 11).

If the answer to this question is negative (NO), i.e. if the start switch has not been turned on, a timer value TMENGR of the engine operation timer of an up-count type is reset to 0 (step 12), and then, the process proceeds to a step 13.

On the other hand, if the answer to the question of the step 11 is affirmative (YES), i.e. if the start switch has already been turned on, the process skips the step 12, and proceeds to the step 13.

In the step 13, it is determined whether or not the lift holding flag F_LFT is equal to 1.

If the answer to this question is negative (NO), i.e. if the control has been shifted to the normal mode immediately after the turn-on of the ignition switch, the steps 22 and 23 are executed, followed by terminating the present process.

On the other hand, if the answer to the question of the step 13 is affirmative (YES), i.e. if the control has been shifted to the holding mode in which the intake lift LIFTIN is held immediately after the turn-on of the ignition switch, it is determined whether or not the timer value TMENGR of the engine operation timer is not less than the second predetermined time period TREF2 which is set in the step 4 (step 14).

If the answer to this question is negative (NO), i.e. if the timer value TMENGR of the engine operation timer has not reached the second predetermined time period TREF2, it is judged that the lubrication oil OIL for the variable intake lift mechanism 50 has not been sufficiently distributed throughout the mechanism after turn-on of the start switch, and hence the control for the holding mode is continued, so that the step 5 and 6 are executed, followed by terminating the present process.

On the other hand, if the answer to the question of the step 14 is affirmative (YES), i.e. if the second predetermined time period TREF2 has elapsed after the turn-on of the start switch, it is determined that the lubrication oil OIL required for the variable intake lift mechanism 50 has been sufficiently distributed throughout the mechanism along with the operation of the engine 3, causing the oil amount to reach the predetermined amount. Accordingly, it is judged that the control for the holding mode should be terminated and the control should be shifted to the normal mode, so that the steps 21 to 23 are executed, followed by terminating the present process.

Figure 7:
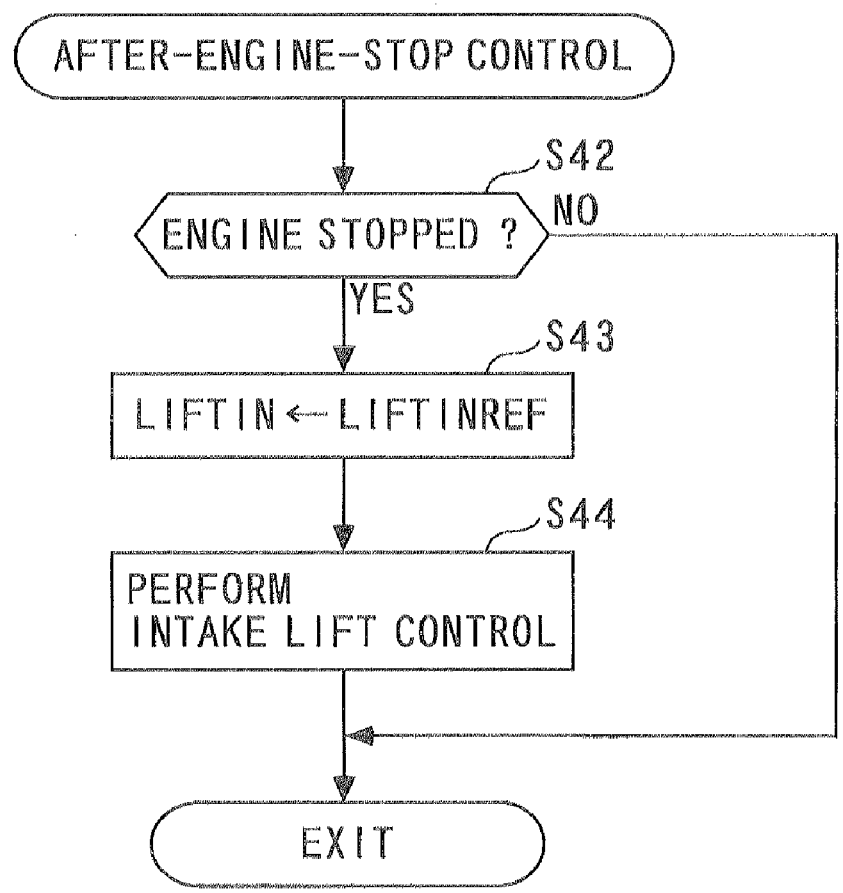
FIG. 7 is a flowchart of an after-engine-stop control process.

FIG. 7 shows an after-engine-stop control process. The present process is executed after the ignition switch is turned off. First, it is determined whether or not the crankshaft 3c of the engine 3 is completely stopped (step 42). If the answer to this question is negative (NO), the present process is terminated.

On the other hand, if the answer to the question of the step 42 is affirmative (YES), i.e. if the crankshaft 3c of the engine 3 is completely stopped, the intake lift LIFTIN is set to the predetermined lift LIFTINREF (step 43), and the intake lift actuator 70 of the variable intake lift mechanism 50 is driven according to the setting, whereby the intake lift LIFTIN is controlled to the predetermined lift LIFTINREF (step 44), followed by terminating the present process.

By carrying out such control of the intake lift LIFTIN described above after the crankshaft 3c of the engine 3 is stopped, it is possible to shift the control to the holding mode without operating the variable intake lift mechanism 50 at all, when holding the intake lift LIFTIN upon turn-on of the ignition switch next time.

It should be noted that as described above, the intake lift LIFTIN is controlled after the crankshaft 3c of the engine 3 is completely stopped for the following reason:

In the engine 3, after the ignition switch is turned off, the throttle valve 13a is opened to introduce the intake air downstream thereof to thereby prevent the negative pressure from being generated, whereby the control for stopping the piston 3d at a predetermined position where the valve overlap of the intake valve 8 and the exhaust valve 9 is not caused is carried out. This is for preventing the degradation of startability due to back-flow of the exhaust gases from the exhaust pipe 5 into the intake pipe 4 through the cylinders 3a after the engine 3 is stopped.

The above-mentioned relation between the intake air caused by opening of the throttle valve 13a and the stop position of the piston 3d is empirically determined in advance. Therefore, if the variable intake lift mechanism 50 is driven before the piston 3d is completely stopped, there is a fear that the above-mentioned relation between the intake air and the stop position of the piston 3d is broken by the influence of changes in the intake lift LIFTIN, whereby it is not possible to stop the piston 3d at the predetermined position. Therefore, so as to positively prevent such an inconvenience, the intake lift LITIN is controlled after the crankshaft 3c of the engine 3 is completely stopped.

Figure 8:
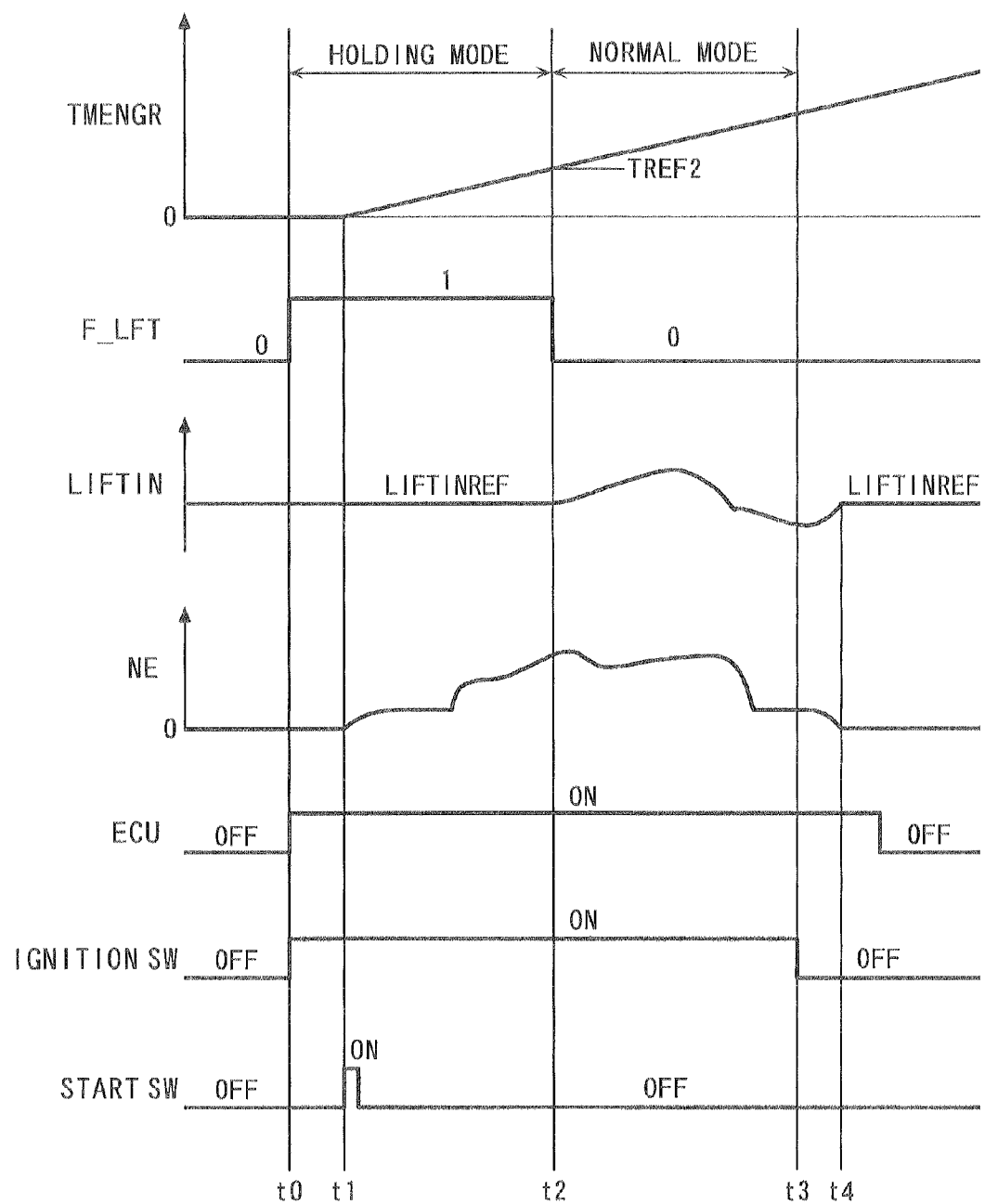
FIG. 8 is a timing chart showing an example of operations obtained by the control processes according to the embodiment.

FIG. 8 shows examples of operations obtained by the intake air amount control process and the after-engine-stop control process described hereinbefore for a case where the stop time period TMENGS of the engine 3 is relatively long. In this example, when the ignition switch is turned on (t0), at the same time, the ECU 2 is started, and the intake air amount control process in FIG. 5 is started. In the present example, since the stop time period TMENGS is long, TMENGS≧TREF1 is satisfied (step 2: YES). Along with this, the second predetermined time period TREF2 is set according to the stop time period TMENGS of the engine 3 (step 4). Further, it is determined that the control is to be shifted to the holding mode in which the intake lift LIFTIN is held, and accordingly, the lift holding flag F_LFT is set to 1. Further, the intake lift LIFTIN is held at the predetermined lift LIFTINREF (step 5) and the throttle valve control for the holding mode is carried out (step 6). Then, when the start switch is turned on (t1), the starting of the engine 3 is started, and the counting of the engine operation timer is started.

Thereafter, when the timer value TMENGR of the operation timer of the engine 3 reaches the second predetermined time period TREF2 (step 14: YES) (t2), the lift holding flag F_LFT is set to 0 (step 21), whereby the control for the holding mode is terminated, and the control is shifted to the above-described normal mode.

Then, when the ignition switch is turned off (t3), the after-engine-stop control process in FIG. 7 is started. At a time point (t4) at which it is determined that the crankshaft 3c of the engine 3 is completely stopped, the intake lift LIFTIN is controlled to the predetermined lift LIFTINREF (step 43 and 44).

As describe above, according to the present embodiment, immediately after the ignition switch is turned on (step 1: YES), if the timer value TMENGS of the engine stop timer, i.e. the stop time period of the engine 3 is not less than the first predetermined time period TREF1 (step 2: YES), it is determined that the oil amount of the lubrication oil OIL for the variable intake lift mechanism 50 does not reach the predetermined necessary amount, so that the operation of the variable intake lift mechanism 50 is inhibited, and the intake lift LIFTIN is held at the predetermined lift LIFTINREF (step 5). Therefore, it is possible to positively prevent the case where the variable intake lift mechanism 50 is operated in the state in which the lubrication oil OIL is insufficient, whereby it is possible to prevent the problems of abrasion, damage, etc. of the variable intake lift mechanism 50 from being caused by the insufficiency of the lubrication oil OIL. Further, during such an intake lift LIFTIN-holding mode, it is possible to properly control the intake air amount by the control of the throttle valve 13a.

Further, the instant the ignition switch is turned on, the ECU 2 is started, and immediately thereafter, the oil amount of the lubrication oil OIL is determined, and hence it is possible to positively inhibit the variable intake lift mechanism 50 from operating in the state in which the lubrication oil OIL is insufficient, after the ECU 2 is started until the starting of the engine 3 is started, and also at the time of starting the engine 3.

Further, the second predetermined time period TREF2 determining the time period over which the holding mode in which the intake lift LIFTIN is held is to be executed is set according to the stop time period of the engine 3 (step 4), and hence it is possible to properly determine the time period over which the holding mode in which the intake lift LIFTIN is held is to be executed according to the degree of the flow of the lubrication oil OIL out of the variable intake lift mechanism 50, and it is possible to start the operation of the variable intake lift mechanism 50 at a proper timing in which the lubrication oil OIL is sufficiently distributed throughout the variable intake lift mechanism 50.

Furthermore, when the engine 3 is stopped, the intake lift actuator 70 of the variable intake lift mechanism 50 is driven to control the intake lift LIFTIN to the predetermined lift LIFTINREF (steps 43 and 44). Therefore, immediately after the ignition switch is turned on next time, if it is determined that the oil amount of the lubrication oil OIL is less than the predetermined amount, it is possible to smoothly shift the control to the holding mode in which the intake lift LIFTIN is held without operating the variable intake lift mechanism 50 at all.

Further, the predetermined lift LIFTINREF is set to a value which is smaller than the maximum lift LINMAX, and is larger than the minimum lift LINMIN, more specifically, to a value which is larger than the intake lift LIFTIN that is set when the engine 3 is in the idle operation, and hence even if the control is shifted to the holding mode in which the intake lift LIFTIN is held immediately after the ignition switch is turned on, and further is directly shifted to the driving mode, it is possible to ensure the intake air amount required for starting and driving, whereby it is possible to improve the startability and the traveling characteristics. Further, by preventing the excessive valve overlap, it is possible to prevent the idle operation from becoming unstable and the exhaust emission from being increased.

Figure 9:
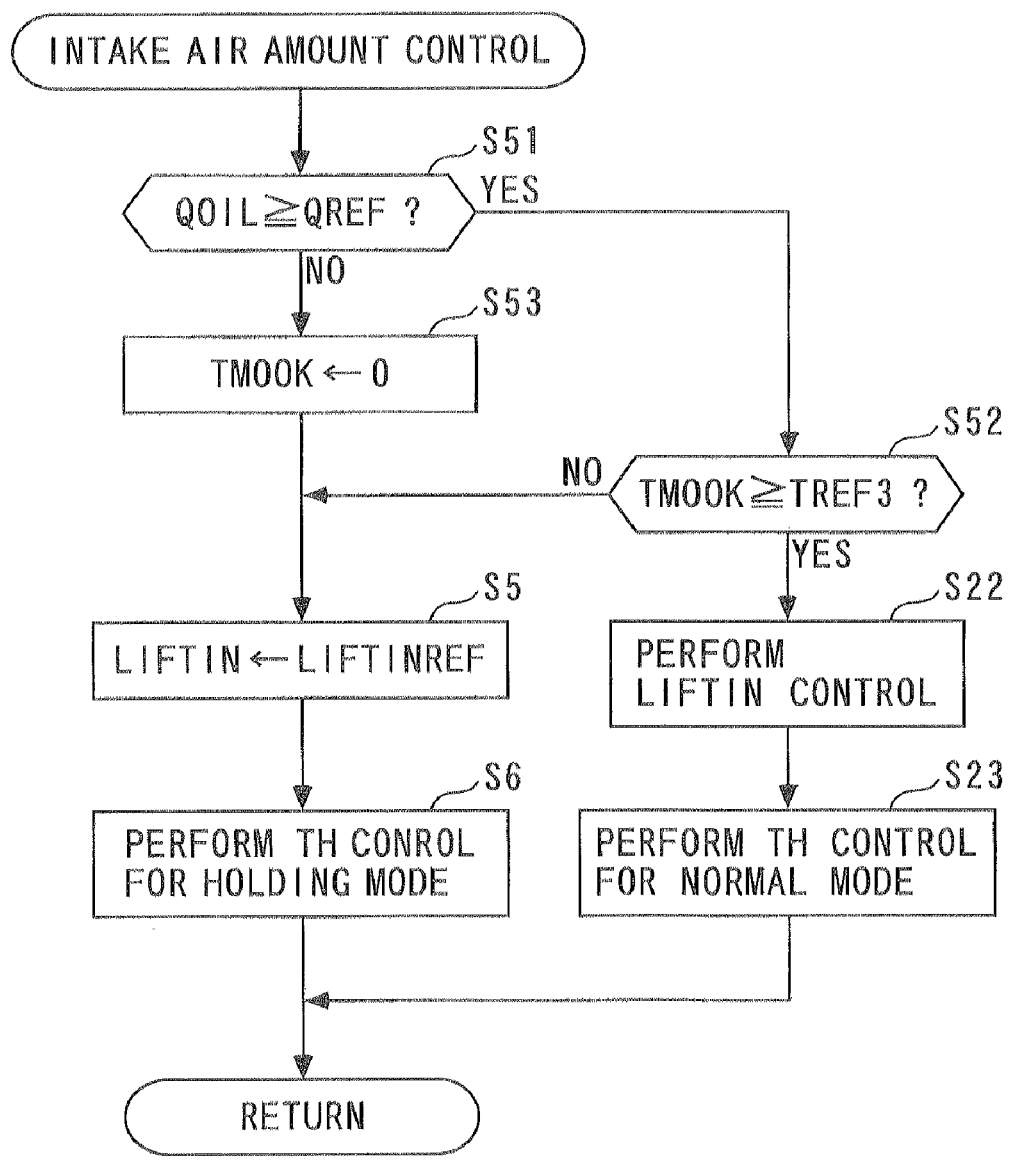
FIG. 9 is a flowchart of an intake air amount control process according to a second embodiment of the present invention.

FIG. 9 shows an intake air amount control process executed by a control system according to a second embodiment of the present invention. In the second embodiment, an oil amount QOIL of the lubrication oil OIL for lubricating the variable intake lift mechanism 50 is detected by an oil amount sensor 26 (see FIG. 2), and the intake air amount control process in FIG. 9 is executed based on the detection result. Further, in FIG. 9, steps executed for the control identical to those of the above-described intake air amount control process in FIG. 5 are denoted by the same step numbers.

First, in a step 51, it is determined whether or not the oil amount QOIL detected by the oil amount sensor 26 is not less than a predetermined amount QREF. If the answer to this question is negative (NO), i.e. if the oil amount QOIL is less than the predetermined amount QREF, a timer value TMOOK of an oil amount timer of an up-count type is reset to 0 (step 53), and further, the steps 5 and 6 are executed, wherein the predetermined lift LIFTINREF is held at the intake lift LIFTIN, and the throttle valve control for the holding mode is carried out, followed by terminating the present process.

On the other hand, if the answer to the question of the step 51 is affirmative (YES), it is determined whether or not the timer value TMOOK of the oil amount timer is not less than a third predetermined time period TREF3 (e.g. 1 sec) (step 52).

If the answer to this question is negative (NO), i.e. if duration of a state in which the oil amount QOIL is not less than the predetermined amount QREF is less than the third predetermined time period TREF3, it is judged that the operation of the variable intake lift mechanism 50 should be inhibited, so that the steps 5 and 6 are executed, followed by terminating the present process.

On the other hand, if the answer to the question of the step 52 is affirmative (YES), i.e. if the state in which the oil amount QOIL is not less than the predetermined amount QREF has continued more than the third predetermined time period TREF3, it is judged that the lubrication oil OIL required for the variable intake lift mechanism 50 is sufficiently distributed throughout the mechanism, and the control should be shifted to the normal mode, so that the LIFTIN control and the throttle valve control for the normal mode are carried out in the respective steps 22 and 23, followed by terminating the present process.

As described above, according to the present embodiment, if the oil amount QOIL is less than the predetermined amount QREF (step 51: NO), it is determined that the lubrication oil OIL for the variable intake lift mechanism 50 does not reach the predetermined necessary amount, so that the operation of the variable intake lift mechanism 50 should be inhibited, and the intake lift LIFTIN is held at the predetermined lift LIFTINREF (step 5). Therefore, similarly to the first embodiment, it is possible to positively prevent the case where the variable intake lift mechanism 50 is operated in the state in which the lubrication oil OIL is insufficient, whereby it is possible to prevent the problems of abrasion, damage, etc. of the variable intake lift mechanism 50 form being caused by the insufficiency of the lubrication oil OIL. Further, during the holding mode in which the intake lift LIFTIN is held as above, it is possible to properly control the intake air amount by controlling the throttle valve 13*a*.

Further, if the duration of the state in which the oil amount QOIL is not less than the predetermined amount QREF is shorter than the third predetermined time period TREF3 (step 52: NO), it is regarded that a determination result that the oil amount QOIL has reached the predetermined necessary amount is not finally determined, so that the control is forcibly shifted to the holding mode. This makes it possible to positively prevent the case where the variable intake lift mechanism 50 is operated in the state in which the lubrication oil OIL is insufficient, in the case where the determination result that the oil amount QOIL has reached the predetermined necessary amount is not finally determined. Further, the oil amount is determined based on the result detected by the oil amount sensor 26 for detecting the oil amount QOIL, and hence it is possible to accurately perform the determination of the oil amount.

It should be noted that the present invention is by no means limited to the embodiments described above, but it can be practiced in various forms. For example, although in the embodiments, the determination of the oil amount is performed immediately after the ECU 2 is started along with turn-on of the ignition switch, instead of this, the determination of the oil amount may be performed immediately after turn-on of the start switch, or immediately after the conditions of the automatic starting are satisfied in a case where the automatic starting is performed.

Further, although in the embodiments, the intake lift LIFTIN is held at the predetermined lift LIFTINREF by driving the intake lift actuator 70 after the turn-on of the ignition switch, a default mechanism which mechanically holds the intake lift at the predetermined lift by the returning force of a spring may be provided, whereby the intake lift LIFTIN may be held at the predetermined lift when the crankshaft 3*c* of the engine 3 is stopped and when the ignition switch is turned on.

Further, although in the embodiments, counting of the engine operation timer is started when the start switch is turned on, instead of this, counting of the engine operation timer may be started when the engine speed NE reaches a predetermined value (e.g. 500 rpm). This makes it possible to cancel the holding mode at a more proper timing in a manner suited to actual operating conditions of the engine 3.

Furthermore, although in the above-described embodiment, the present invention is applied to the gasoline engine installed on a vehicle, this is not limitative, but the present invention can be applied to various types of engines, such as a diesel engine, engines other than the gasoline engine, including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A control system for an internal combustion engine including a variable valve-operating mechanism which is capable of continuously changing a lift of an intake valve, and an intake air amount-adjusting valve which is disposed at a location upstream of the intake valve and is capable of adjusting an intake air amount, comprising:
   oil amount-determining means for determining whether or not an oil amount of lubrication oil that lubricates the variable valve-operating mechanism reaches a predetermined amount;
   variable valve-operating mechanism control means for inhibiting an operation of the variable valve-operating mechanism and holding a lift of the intake valve at a predetermined lift except when it is determined by said oil amount-determining means that the oil amount reaches the predetermined amount; and
   intake air amount-adjusting valve control means for controlling the intake air amount by changing an opening of the intake air amount-adjusting valve when the operation of the variable valve-operating mechanism is inhibited by said variable valve-operating mechanism control means.

2. The control system as claimed in claim 1, wherein said oil amount-determining means carries out determination of the oil amount after the control system is started or after an instruction for starting the engine is given.

3. The control system as claimed in claim 1, wherein said oil amount-determining means carries out determination of the oil amount before starting of the engine is started.

4. The control system as claimed in claim 1, wherein said variable valve-operating mechanism control means inhibits the operation of the variable valve-operating mechanism until a determination result of the oil amount is obtained by said oil amount-determining means.

5. The control system as claimed in claim 1, wherein said oil amount-determining means determines the oil amount based on a stop time period of the engine.

6. The control system as claimed in claim 1, wherein said oil amount-determining means determines whether or not the oil amount reaches the predetermined amount based on an operating time period of the engine.

7. The control system as claimed in claim 6, further comprising predetermined time-setting means for setting the predetermined time based on the stop time period of the engine.

8. The control system as claimed in claim 1, wherein when the engine is stopped, said variable valve-operating mechanism control means controls the variable valve-operating mechanism such that the lift of the intake valve becomes equal to the predetermined lift.

9. The control system as claimed in claim 1, wherein the predetermined lift is smaller than a maximum lift of the intake valve, and is larger than a minimum lift of the intake valve.

10. The control system as claimed in claim 9, wherein the predetermined lift is larger than a lift which is set when the engine is in an idle state.

11. A method of controlling an internal combustion engine including a variable valve-operating mechanism which is capable of continuously changing a lift of an intake valve, and an intake air amount-adjusting valve which is disposed at a location upstream of the intake valve and is capable of adjusting an intake air amount, comprising:
   an oil amount-determining step of determining whether or not an oil amount of lubrication oil that lubricates the variable valve-operating mechanism reaches a predetermined amount;

a variable valve-operating mechanism control step of inhibiting an operation of the variable valve-operating mechanism and holding a lift of the intake valve at a predetermined lift except when it is determined in said oil amount-determining step that the oil amount reaches the predetermined amount; and an intake air amount-adjusting valve control step of controlling the intake air amount by changing an opening of the intake air amount-adjusting valve when the operation of the variable valve-operating mechanism is inhibited in said variable valve-operating mechanism control step.

12. The method as claimed in claim 11, wherein said oil amount-determining step includes carrying out determination of the oil amount after the control system is started or after an instruction for starting the engine is given.

13. The method as claimed in claim 11, wherein said oil amount-determining step includes carrying out determination of the oil amount before starting of the engine is started.

14. The method as claimed in claim 11, wherein said variable valve-operating mechanism control step includes inhibiting the operation of the variable valve-operating mechanism until a determination result of the oil amount is obtained in said oil amount-determining step.

15. The method as claimed in claim 11, wherein said oil amount-determining step includes determining the oil amount based on a stop time period of the engine.

16. The method as claimed in claim 11, wherein said oil amount-determining step includes determining whether or not the oil amount reaches the predetermined amount based on an operating time period of the engine.

17. The method as claimed in claim 16, further comprising a predetermined time-setting step of setting the predetermined time based on the stop time period of the engine.

18. The method as claimed in claim 11, wherein when the engine is stopped, said variable valve-operating mechanism control step includes controlling the variable valve-operating mechanism such that the lift of the intake valve becomes equal to the predetermined lift.

19. The method as claimed in claim 11, wherein the predetermined lift is smaller than a maximum lift of the intake valve, and is larger than a minimum lift of the intake valve.

20. The method as claimed in claim 19, wherein the predetermined lift is larger than a lift which is set when the engine is in an idle state.

* * * * *